United States Patent [19]

Mueller

[11] 4,025,421
[45] May 24, 1977

[54] GASKET INSPECTION METHOD

[75] Inventor: Hugo Mueller, Livingston, N.J.

[73] Assignee: American Flange & Manufacturing Co., Inc., Linden, N.J.

[22] Filed: Nov. 28, 1975

[21] Appl. No.: 635,792

[52] U.S. Cl. .............................. 209/85; 73/432 R
[51] Int. Cl.² .......................................... B07C 5/06
[58] Field of Search .......... 73/45.1, 432 R; 209/80, 209/83, 85; 277/2

[56] References Cited

UNITED STATES PATENTS 3,325,005   6/1967   Naslund et al. ..................... 209/80

OTHER PUBLICATIONS

Marzen, F. E.; "Sealed Contact Sorting Mechanism" in Western Electric Technical Digest, No. 24; Oct. 1971; pp. 27, 28.

*Primary Examiner*—Richard C. Queisser
*Assistant Examiner*—John S. Appleman

[57] ABSTRACT

A method of sensing the presence and proper positioning of an annular sealing gasket encircling the neck of a closure flange employed in the fabrication of steel shipping drums. The closure flange consists of an upstanding internally threaded cylindrical neck surrounded by a laterally extending noncircular base at its lower end. An annular, resilient sealing gasket is placed over the flange neck so as to seat above the flange base. The gasket is sensed for presence and proper positioning as the flange moves along a predetermined path with automatic ejection of improperly gasketed flanges.

7 Claims, 8 Drawing Figures

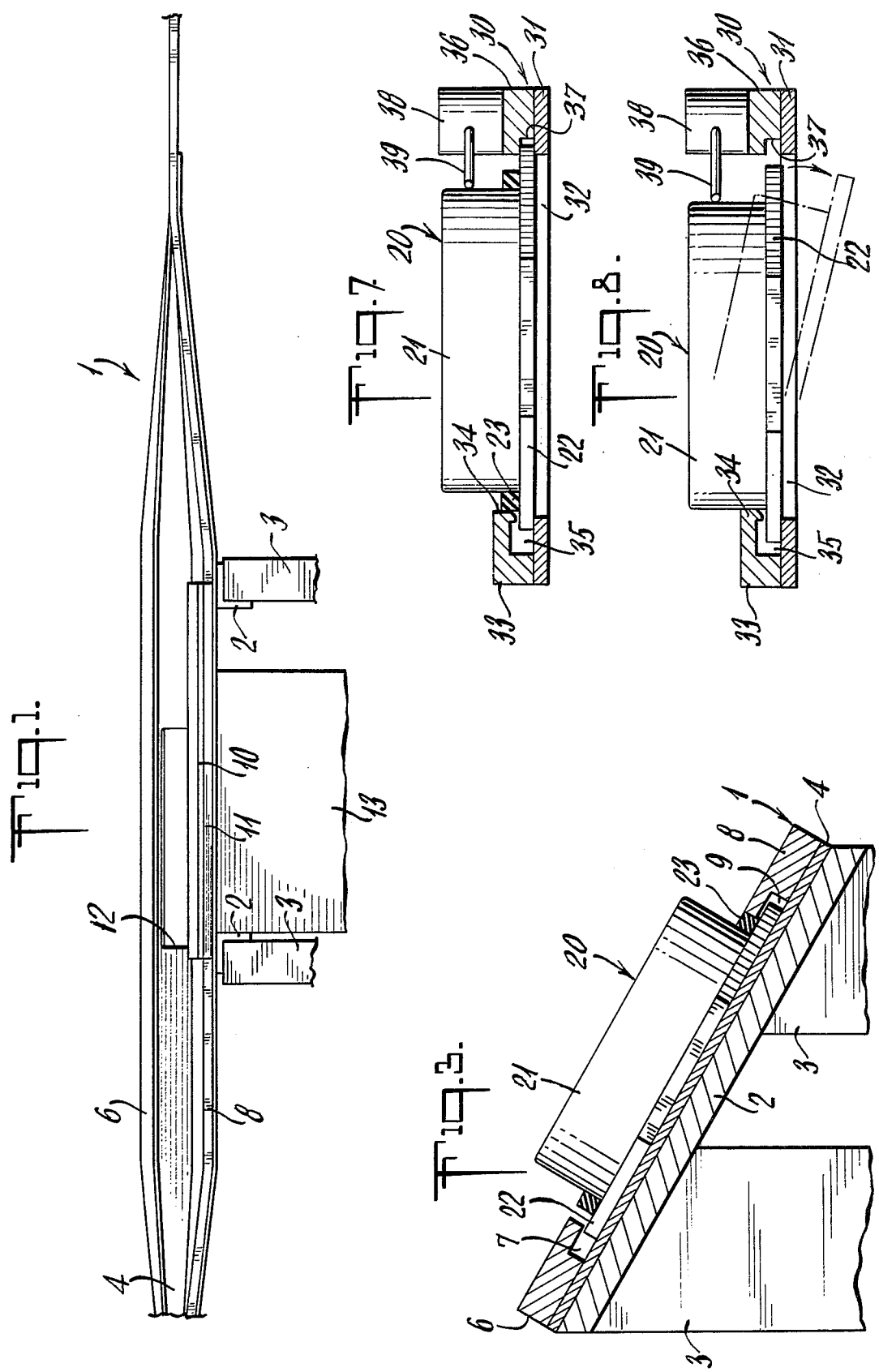

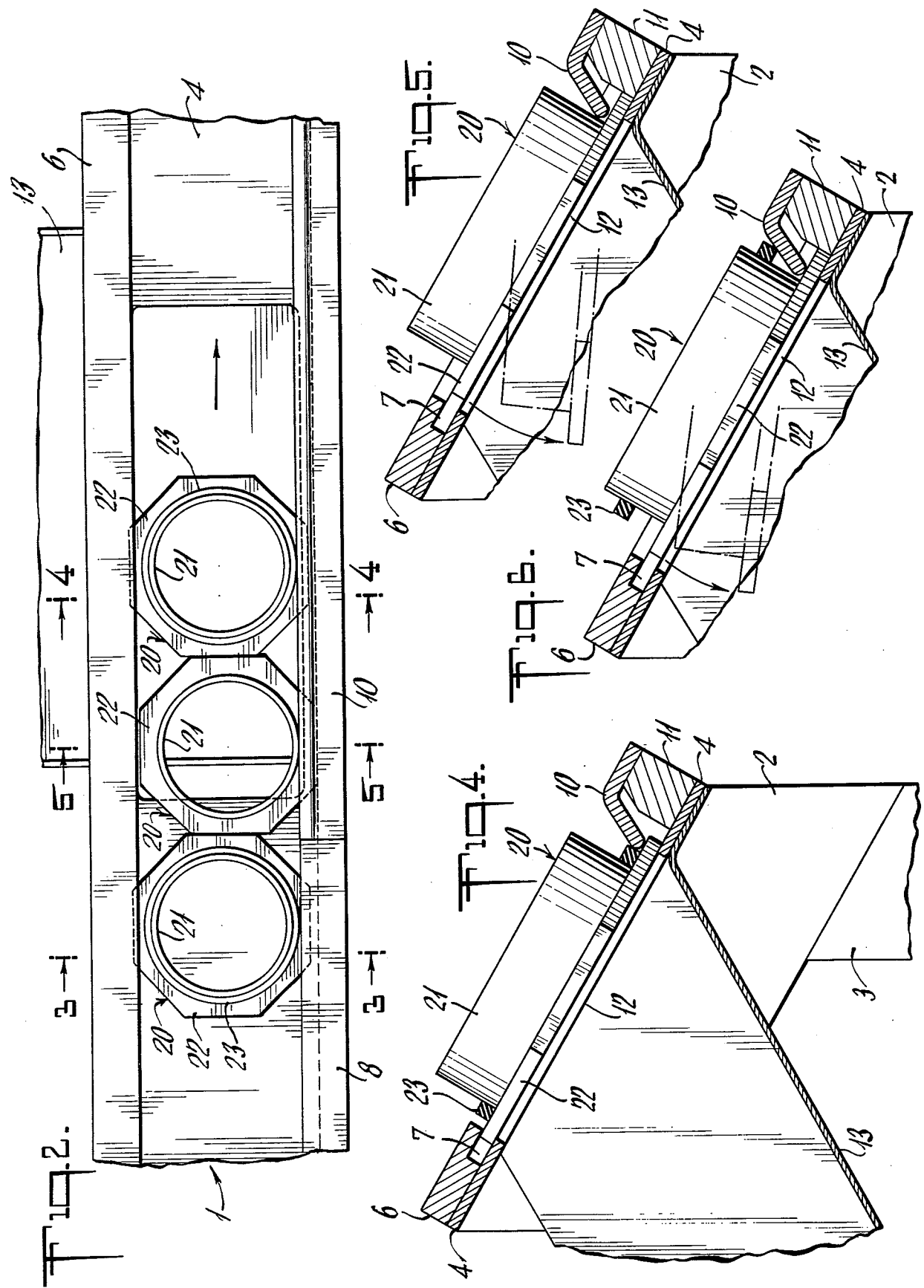

GASKET INSPECTION METHOD

BACKGROUND OF THE INVENTION

In the fabrication of industrial use steel containers, such as 55-gallon drums, it is most important that the joint between the pressed-in threaded closure flange and the surrounding container wall be properly gasketed. In order to adequately asssure that a sealing gasket has been properly applied to the closure flange prior to insertion of the flange within the drum stock opening, an accurate fail-safe inspection operation is required. Moreover, to provide maximum protection against failure, it is not uncommon to inspect the closure flange for gasket presence at the final step in the flange manufacture as well as just prior to inserting the flange within the container wall during the drum fabrication.

A number of gasket detecting schemes have been employed in the past with varying degrees of sucess. Most of these prior attempts, however, have either involved relatively complex mechanisms which are inherently costly and troublesome or have in some way disturbed the gasket during the sensing operation introducing an additional unwanted variable. The problem is one of performing the above described inspection operation in a simple efficient manner readily adaptable to various flange handling situations.

SUMMARY

The invention method herein disclosed advantageously answers the above mentioned problem in a very simple and unique manner. This is accomplished by conveying flanges base down along a predetermined path past an inspection station capable of sensing the presence and proper positioning of the flange gasket. The sensing step is carried out by restraining properly gasketed flanges against lateral displacement from the predetermined path as they are conveyed continuously past the ejecting station. At the same time, improperly gasketed flanges are displaced laterally a slight amount resulting in their ejection from the predetermined path. The invention gasket inspection method is thus performed in a very simple straightforward manner without resort to complex mechanism or in fact any moving parts at all, nor is there any shifting or repositioning of properly applied gaskets during the process.

It is, accordingly, a principal object of the invention to provide a new method of inspecting for the presence and proper positioning of closure flange sealing gaskets.

Another object is to directly sense the presence and proper positioning of closure flange sealing gaskets and eject failures during continuous movement of flanges along a predetermined path.

Other and more detailed objects will in part be obvious and in part pointed out as the description of the invention taken in conjunction with the accompanying drawing proceeds. In that drawing:

FIG. 1 is a front elevational view of the apparatus for carrying out the gasket inspection method of the invention;

FIG. 2 is an enlarged top plan view of the apparatus of FIG. 1.

FIG. 3 is a view taken along line 3-3 in FIG. 2 and looking in the direction of the arrows;

FIG. 4 is a view taken along line 4-4 in FIG. 2 and looking in the direction of the arrows;

FIG. 5 is a view taken along line 5-5 in FIG. 2 and looking in the direction of the arrows;

FIG. 6 is a view similar to FIG. 5 but showing a flange being rejected for improper gasket positioning;

FIG. 7 is a part sectional part elevational view of the inspection station in a modified form of apparatus for practicing the invention; and FIG. 8 is a view similar to FIG. 7 showing an ungasketed flange being rejected.

An apparatus for carrying out the method of the invention consists of a longitudinally extending feed chute 1 held by suitable lateral brackets 2 affixed to vertical support members 3. The chute 1 is made up of a base plate 4 secured to the brackets 2 and, as clearly seen in FIGS. 1 and 3, is twisted so as to provide an intermediate section disposed at an approximate 30 degree angle to the horizontal. Secured to the upper surface of the base plate 4 is an upper edge guide rail 6 having an inwardly facing undercut 7. Directly opposing the upper edge guide rail 6 is a lower edge guide rail 8 having an inwardly facing undercut 9 and being interrupted at the intermediate section of the feed chute. An elongated gasket sensing probe 10 having an angled cross-sectional configuration is secured to the base plate 4 within the interruption in the lower guide rail 8 by means of the mounting block 11.

A rectangular reject opening 12 is formed in the base plate 4 within the chute intermediate section having its elongated opposite sides underlying the inward extent of the upper rail 7 and the sensing probe 10. An ejection chute 13 is disposed beneath the opening 12.

An article on which the method of the invention is capable of performing consists of a closure flange 20 having an upstanding internally threaded cylindrical neck 21. The lower end of the neck 21 is surrounded by a laterally extending base 22 with an octagonal peripheral configuration. Under normal manufacturing conditions, the flange has a resilient sealing gasket 23 seated at the juncture of the neck 21 and the base 22.

Considering in detail the gasket inspection method of the invention, closure flanges 20 are advanced along the feed chute 1 with the flange base 22 seated on the base plate 4. As seen in FIG. 2, adjacent flange bases remain in contact flat-to-flat during advancement through the gasket inspection station. The flange base 22 nests within the undercut 9 of the lower guide rail 8 regardless of gasket presence or positioning as the reject opening 12 is approached. As a properly gasketed flange advances onto the gasket sensing probe 10, the presence of the gasket 23, which acts as a gage point, keeps the flange base 22 centrally positioned over the reject opening 12 so that the flange base also nests within the undercut 7 of the upper guard rail 6. With opposite sides of the flange base 22 thus supported by the marginal portions of the base plate 4, the flange advances along the gasket sensing probe 10 until the reject opening 12 is spanned and the flange base is completely supported once again by the base plate 4.

FIGS. 2 and 5 illustrate how the invention method effectively eliminates an ungasketed flange from the feed chute 1. The ungasketed flange 20, shown entering the gasket inspection station in FIG. 2, is seen to advance along the feed chute 1 with its base 22 nested within the lower guide rail undercut 9. FIG. 5 shows how the absence of a gasket causes the flange to shift downwardly as the gasket sensing probe 10 contacts the flange neck 21. The consequent lateral displacement of the flange 21 withdraws the flange base 22 from the undercut 7 so as to clear the edge of the reject opening 12 and permit the flange to freely fall into the ejection chute 13.

Turning to FIG. 6, it can be seen how the gasket inspection method of the invention is performed on a flanged having an improperly positioned gasket. In the event the gasket 23 gets pushed up the flange neck 21, the probe 10 senses the absence of the gasket at its proper position causing the flange to be rejected as described above.

A modified form of apparatus for performing the invention method is shown in FIGS. 7 and 8 wherein a feed chute 30, like the principal embodiment, has a base plate 31 provided with an elongated central reject opening 32. Secured to the upper surface of the base plate 31 is an outer edge guide rail 33 having an inwardly projecting gasket sensing probe 34 which forms an undercut 35. An inner edge guide rail 36 is also secured to the base plate 31 forming an undercut 37. In this embodiment, instead of twisting the chute to the 30 degree angle described above, a block 38 is affixed to the inner guide rail 36 having an elongated spring guide wire 39 extending therefrom into the path of the advancing flange. The function of the guide wire 39 being to urge the advancing flange laterally towards the gasket sensing probe 34. Thus, as clearly seen in FIG. 7, the properly positioned flange gasket 23 bears against the sensing probe 34 and centrally positions the flange base 22 for passage over the reject aperture 32. In the absence of a flange gasket, the flange is allowed to shift laterally under the influence of the spring wire 39 causing the defective flange to drop through the reject aperture as above described.

From the foregoing it is apparent that a very simple and trouble-free method of inspecting closure flanges for defective gasketing has been brought forth. The invention makes it quite easy to effectively monitor flange handling operations for gasketing defects without reliance on complex electrical or mechanical devices. Other changes in or modifications of the construction and different embodiments of the invention would suggest themselves to those skilled in the art and should be made without departing from the spirit or scope of the invention. It is, accordingly, intended that all matter contained in the above description, or shown in the accompanying drawing, shall be interpreted as being illustrative and not in a limiting sense.

I claim:

1. A method of inspecting closure flanges having an upstanding cylindrical neck surrounded by a laterally extending base and an annular sealing gasket seated at the juncture of the neck and base, comprising the steps of conveying flanges longitudinally through an inspection station, sensing the presence and proper positioning of said gasket at said inspection station, restraining properly gasketed flanges against lateral movement at said station permitting said properly gasketed flanges to pass therethrough, allowing improperly gasketed flanges to move laterally at said inspection station and ejecting said improperly gasketed flanges in response to said lateral movement.

2. A method of inspecting closure flanges as in claim 1, and employing said gasket as a gage point for said restraining.

3. A method of inspecting closure flanges as in claim 1, and supporting the base of properly gasketed flanges at said inspection station.

4. A method of inspecting closure flanges as in claim 1, wherein said flanges are base down during said conveying through said inspection station.

5. A method of inspecting closure flanges having an upstanding cylindrical neck surrounded by a laterally extending base and an annular sealing gasket seated at the juncture of the neck and base, comprising the steps of supporting said flange base while conveying flanges along a predetermined path, sensing the presence and proper positioning of said gasket during said conveying, permitting passage of properly gasketed flanges, displacing improperly gasketed flanges relative to said supporting in response to said sensing and ejecting said improperly gasketed flanges from said predetermined path.

6. A method of inspecting closure flanges as in claim 5 and effecting said displacing under the influence of gravity.

7. A method of inspecting closure elements having an upstanding cylindrical wall surrounded by a laterally extending collar and an annular sealing gasket seated at the juncture of the wall and collar, comprising the steps of conveying elements longitudinally through an inspection station, directly sensing the presence and proper positioning of said gasket at said inspection station, restraining properly gasketed elements against lateral movement at said station permitting said properly gasketed elements to pass therethrough, allowing improperly gasketed elements to move laterally at said inspection station and ejecting said improperly gasketed elements in response to said lateral movement.

* * * * *